(12) United States Patent
Nakamura

(10) Patent No.: US 8,220,855 B2
(45) Date of Patent: Jul. 17, 2012

(54) TAILGATE STRUCTURE

(75) Inventor: Mitsuyoshi Nakamura, Wako (JP)

(73) Assignee: Honda Motor Co., Ltd., Tokyo (JP)

( * ) Notice: Subject to any disclaimer, the term of this patent is extended or adjusted under 35 U.S.C. 154(b) by 111 days.

(21) Appl. No.: 12/309,434

(22) PCT Filed: Jun. 12, 2008

(86) PCT No.: PCT/JP2008/061166
§ 371 (c)(1),
(2), (4) Date: May 8, 2009

(87) PCT Pub. No.: WO2008/153197
PCT Pub. Date: Dec. 18, 2008

(65) Prior Publication Data
US 2010/0019522 A1 Jan. 28, 2010

(30) Foreign Application Priority Data
Jun. 12, 2007 (JP) .................................. 2007-155180

(51) Int. Cl.
B60J 5/00 (2006.01)
B60J 5/10 (2006.01)
B62D 25/10 (2006.01)

(52) U.S. Cl. ...... 296/56; 296/50; 296/146.6; 296/146.7; 49/503

(58) Field of Classification Search ............... 296/146.8, 296/146.5, 146.11, 106, 56, 50, 193.06, 146.12; 49/502, 503; B60J 5/10, 5/00; B62D 25/10
See application file for complete search history.

(56) References Cited

U.S. PATENT DOCUMENTS

| | | | | |
|---|---|---|---|---|
| 5,906,073 A * | 5/1999 | Hori | | 49/503 |
| 6,474,721 B2 * | 11/2002 | Nishikawa et al. | | 296/146.6 |
| 6,776,449 B2 * | 8/2004 | Komatsu et al. | | 296/146.5 |
| 6,991,273 B2 * | 1/2006 | Kim | | 292/336.3 |
| 7,118,153 B2 * | 10/2006 | Kitayama et al. | | 296/57.1 |
| 2002/0024234 A1 * | 2/2002 | Ishikawa et al. | | 296/146.8 |
| 2003/0071481 A1 | 4/2003 | Igarashi et al. | | |
| 2003/0107235 A1 | 6/2003 | Komatsu et al. | | |
| 2003/0173796 A1 | 9/2003 | Harima et al. | | |
| 2004/0041438 A1 * | 3/2004 | Simon et al. | | 296/146.7 |
| 2007/0170751 A1 * | 7/2007 | Tanaka et al. | | 296/146.6 |
| 2009/0026793 A1 * | 1/2009 | Ichinose et al. | | 296/76 |

FOREIGN PATENT DOCUMENTS

| | | |
|---|---|---|
| JP | 53-138328 UA | 11/1978 |
| JP | 2000-177397 A | 6/2000 |
| JP | 2003-267054 | 9/2003 |
| JP | 2005264664 A | 9/2005 |

* cited by examiner

Primary Examiner — Glenn Dayoan
Assistant Examiner — Sunsurraye Westbrook
(74) Attorney, Agent, or Firm — Carrier Blackman & Associates, P.C.; Joseph P. Carrier; William D. Blackman

(57) ABSTRACT

A tailgate structure having a tailgate (17) composed of an outer panel (31), a frame (32), and a lining (33); and a lock mechanism (43). The frame has an opening (61) formed between the lock mechanism and a mounting hole (35) for an externally mounted component, the hole being formed in the outer panel. The lining has a protrusion (68) that protrudes toward the exterior of the vehicle. The protrusion is positioned on a line that connects the mounting hole and the lock mechanism. When a rod-shaped member is inserted into the tailgate from the mounting hole, the rod-shaped member will come into contact with the protrusion and will not reach the lock mechanism.

16 Claims, 5 Drawing Sheets

TAILGATE STRUCTURE

TECHNICAL FIELD

The present invention relates to a tailgate structure in which a lock mechanism is provided to a tailgate, and a mounting hole for an externally mounted component is formed in an outer panel of the tailgate.

The term "externally mounted component" used herein refers to a component that is mounted on the tailgate using a mounting hole formed in the outer panel. In this specification, the externally mounted components include a license plate and a lamp for illuminating the license plate but are not limited to these examples.

BACKGROUND ART

In a tailgate structure of a vehicle, a tailgate is formed from an outer panel, an inner panel (referred to below as a frame), and a lining; and is provided to a vehicle body so as to be capable of opening and closing.

A lock mechanism is provided to a lower end part of the tailgate. The lock mechanism interlocks with an anchor that is fixed to the vehicle body, thereby keeping the tailgate in a closed state.

Such a tailgate structure is known, having been disclosed in Japanese Patent Application Laid-Open Publication No. 2003-267054. In a locked state such that the tailgate is closed and the lock mechanism is interlocked with the anchor, the tailgate structure is prevented from being improperly unlocked from outside the vehicle.

A plurality of wall parts is provided to the outer panel and frame of the tailgate structure, and the lock mechanism is enclosed by the plurality of wall parts. Having the lock mechanism surrounded by the plurality of wall parts makes it possible to prevent the lock mechanism from being improperly unlocked by a rod-shaped member inserted from outside the vehicle.

However, the plurality of wall parts are integrally provided to the outer panel and the frame of the tailgate structure in order to prevent the lock mechanism from being improperly unlocked, which adds complexity to the shape of the outer panel and the frame (i.e., the tailgate).

Synthetic resin members are used for the outer panel and the frame, allowing the outer panel and frame to be formed in a complex shape.

However, using synthetic resin members for the outer panel and frame makes it necessary to ensure that the tailgate is rigid.

DISCLOSURE OF THE INVENTION

An object of the present invention is to provide a tailgate structure that prevents a tailgate from being unlocked improperly, allows the shape of the tailgate to be simplified, and enables the rigidity of the tailgate to be readily ensured.

According to a first aspect of the present invention, there is provided a tailgate structure comprising: a tailgate comprised of an outer panel with a mounting hole formed for an externally mounted component, a frame provided on that side of the outer panel which faces a vehicle compartment, and a lining for covering the frame from inside the vehicle compartment, the tailgate being adapted to be openably/closably disposed on a vehicle body; and a lock mechanism provided on the frame so as to allow interlocking engagement of the tailgate with the vehicle body, characterized in that the frame has an opening formed between the mounting hole and the lock mechanism, and the lining has a protrusion protruding through the opening toward the outer panel along a straight line passing over the mounting hole and the lock mechanism.

An opening is thus formed between the mounting hole and the lock mechanism in the frame, and a protrusion that protrudes toward the outer panel through the opening is formed in the lining. The protrusion protrudes along a straight line that connects the mounting hole and the lock mechanism.

Accordingly, a rod-shaped member inserted into the tailgate from the mounting hole will come into contact with the protrusion, and will be prevented from reaching the lock mechanism. It is thereby possible to prevent the tailgate from being improperly unlocked.

It is thus possible to prevent the tailgate from being improperly unlocked using a simple configuration merely involving an opening being formed in the frame and a protrusion being provided to the lining. Therefore, the frame and lining (tailgate) can be fashioned in a less complicated shape.

Simplifying the shape of the frame also makes it possible to form the frame using steel, and the rigidity of the tailgate can be readily ensured.

Additionally, causing the protrusion in the lining to protrude toward the outer panel makes it possible to make the lining protrude toward the exterior of the vehicle body. As a result, it is possible to increase the space inside the vehicle compartment, and improve utility in the vehicle compartment.

Preferably, the protrusion has a stepped part that extends in the direction of the exterior of the vehicle. Therefore, a simple structure can prevent the lock from being improperly released, and the rigidity of the lining can be improved. Moreover, the thickness of the lining can be reduced as a result of the protrusion having a stepped part that extends toward the exterior of the vehicle.

Desirably, the stepped part is provided in a plurality of locations of the tailgate toward a center of a width direction of the vehicle. Therefore, the rigidity of the lining can be further improved.

It is desirable that the lock mechanism be provided at a vehicle-width-direction center of the frame, the frame include a framework that is formed substantially in a V-shape and extends steeply upward to sides of the vehicle from a region where the lock mechanism is provided, and the opening be formed in the frame along the V-shaped framework. Accordingly, the rigidity of the frame can be ensured by the framework even if an opening is formed in the frame. Using a framework to ensure the rigidity of the frame makes it possible to make the opening relatively larger. It is thereby possible to increase the size of the protrusion, make it more certain that a rod-shaped member inserted into the tailgate from the mounting hole will come into contact with the protrusion, and increase the likelihood that the rod-shaped member will be prevented from reaching the lock mechanism. Additionally, making the protrusion larger makes it possible to further increase the space in the vehicle compartment, and it is possible to improve utility in the vehicle compartment.

In a preferred form, the lining includes: a first wall part for covering the generally V-shaped framework formed in the frame; a second wall part for covering an upper framework that connects both ends of the substantially V-shaped framework and is formed in a position that is closer to the outer panel than the substantially V-shaped framework in the exterior direction of the vehicle; and a protrusion bottom part which is formed lower than the second wall part and closely adjacent to the outer panel in the exterior direction of the vehicle. Provision of the substantially V-shaped framework and an upper framework makes it possible to ensure an even larger sized opening. It is thereby possible for the protrusion to protrude even further toward the exterior of the vehicle, and the space inside the vehicle compartment can be further increased.

In one preferred form, the tailgate structure further comprises a transmitting member, disposed in a space formed between the outer panel and the lining, for transmitting an action of a lock operation part to lock and unlock the lock mechanism, and the transmitting member has a curved part that curves toward the exterior of the vehicle in a region corresponding to the protrusion.

When the curved part is formed on the transmission member so as to correspond to the protrusion of the lining, the transmitting member can thus be disposed in the space between the outer panel and the protrusion of the lining. Moreover, the transmitting member can be connected between the lock operating part and the lock mechanism at the shortest distance, even when the protrusion is positioned between the lock operating part and the lock mechanism. Extra space in the tailgate for disposing components is rendered unnecessary, and the tailgate can be prevented from becoming complicated.

The curved part preferably has a first curved part that curves toward the exterior of the vehicle, and a second curved part that curves toward the lock mechanism from an end part of the first curved part; and the first curved part curves at a position that is set apart from the wall parts of the lining. Therefore, the transmitting member can be prevented from interfering with the protrusion of the lining, even when the transmitting member is operated (moved) using the lock operating part.

Desirably, the curved part further has a third curved part that curves toward the vehicle compartment from an end part of the second curved part, and an end part of the third curved part is connected to the lock mechanism. Therefore, the end part of the transmitting member on the lock mechanism side will be set apart from the outer panel by the third curved part, the transmitting member will not be readily operated from outside of the vehicle, and the tailgate will be prevented from being improperly unlocked.

Preferably, the third curved part curves at a position that is set apart from the wall parts of the protrusion. Therefore, the transmitting member can be prevented from interfering with the protrusion of the lining, even when the transmitting member is operated (moved) using the lock operating part.

BEST MODE FOR CARRYING OUT THE INVENTION

Preferred embodiments of the present invention will now be discussed with reference to the accompanying drawings.

Figure 1:
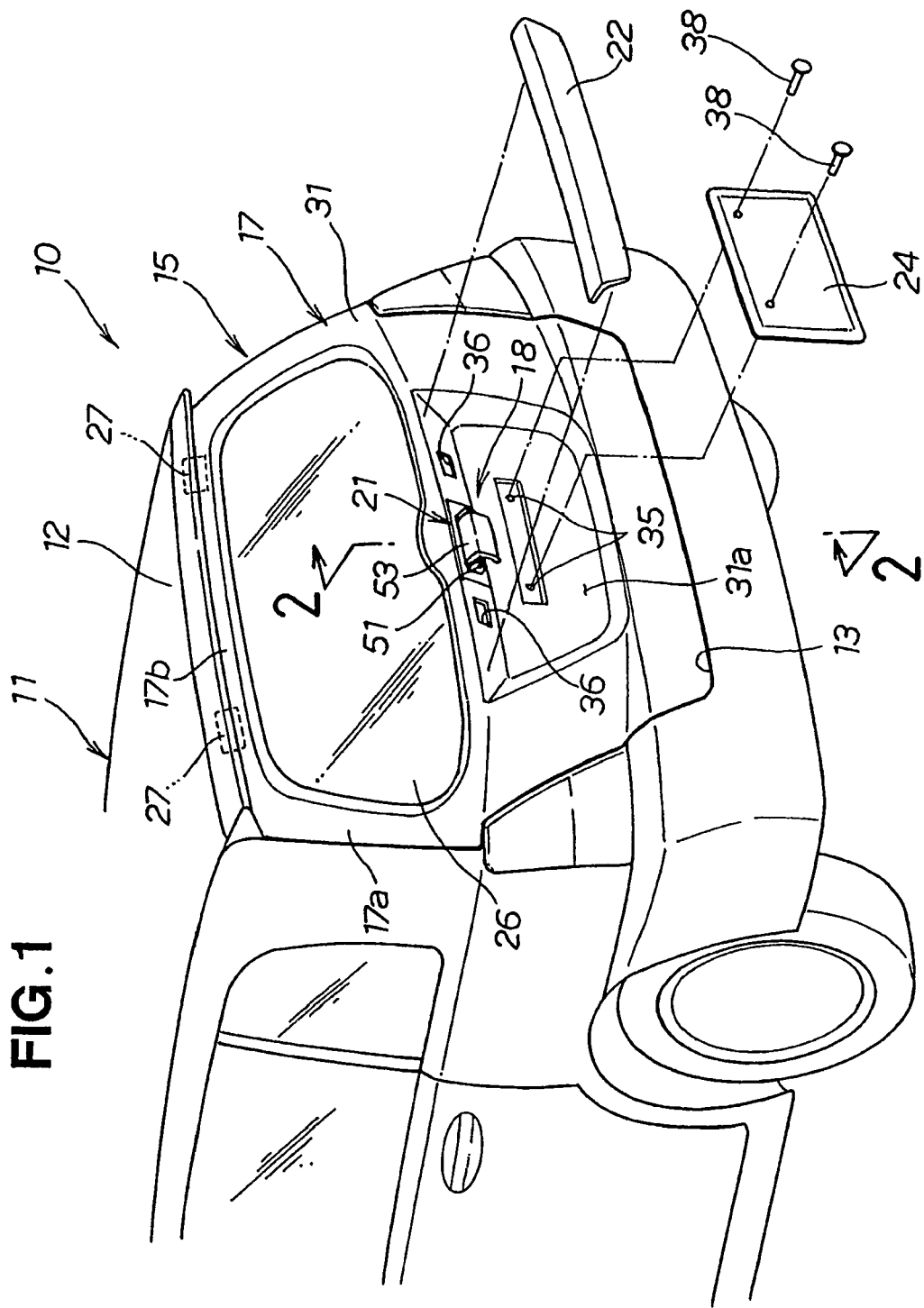
FIG. 1 is a perspective view showing a vehicle employing a tailgate structure according to the present invention.

In an automotive vehicle 10 shown in FIG. 1, a tailgate opening 13 is formed in a rear part 12 of a vehicle body 11, and a tailgate structure 15 is provided to the tailgate opening 13.

The tailgate structure 15 has a tailgate 17 that is capable of opening and closing the tailgate opening 13, a lock device 18 (see also FIG. 2) that is capable of interlocking when the tailgate 17 is in a closed state, a cover member 22 for covering a handle 21 of the lock device 18, a license plate (externally mounted component) 24 mounted on the tailgate 17, and a lamp (externally mounted component; not shown) for illuminating the license plate 24.

A tailgate window glass 26 is provided to an upper half 17a of the tailgate 17.

The cover member 22 is mounted at the substantial center of the tailgate 17 using a fastening member (not shown), for example.

An upper end part 17b of the tailgate 17 is mounted on the tailgate opening 13 via hinges 27, 27. The tailgate 17 is swung in the vertical direction around the hinges 27, 27 as fulcra, thereby opening and closing the tailgate opening 13.

Formed in the tailgate 17 are plate mounting holes (mounting holes) 35, 35 for mounting the license plate 24 on an outer panel 31; and lamp mounting holes (mounting holes) 36, 36 for mounting the lamp (not shown).

Mounting members 38, 38 are made to interlock with the plate mounting holes 35, whereby the license plate 24 is mounted on an outer surface 31a of the outer panel 31.

The lamp (not shown) is mounted on the outer surface 31a of the outer panel 31 via the lamp mounting holes 36.

Figure 2:
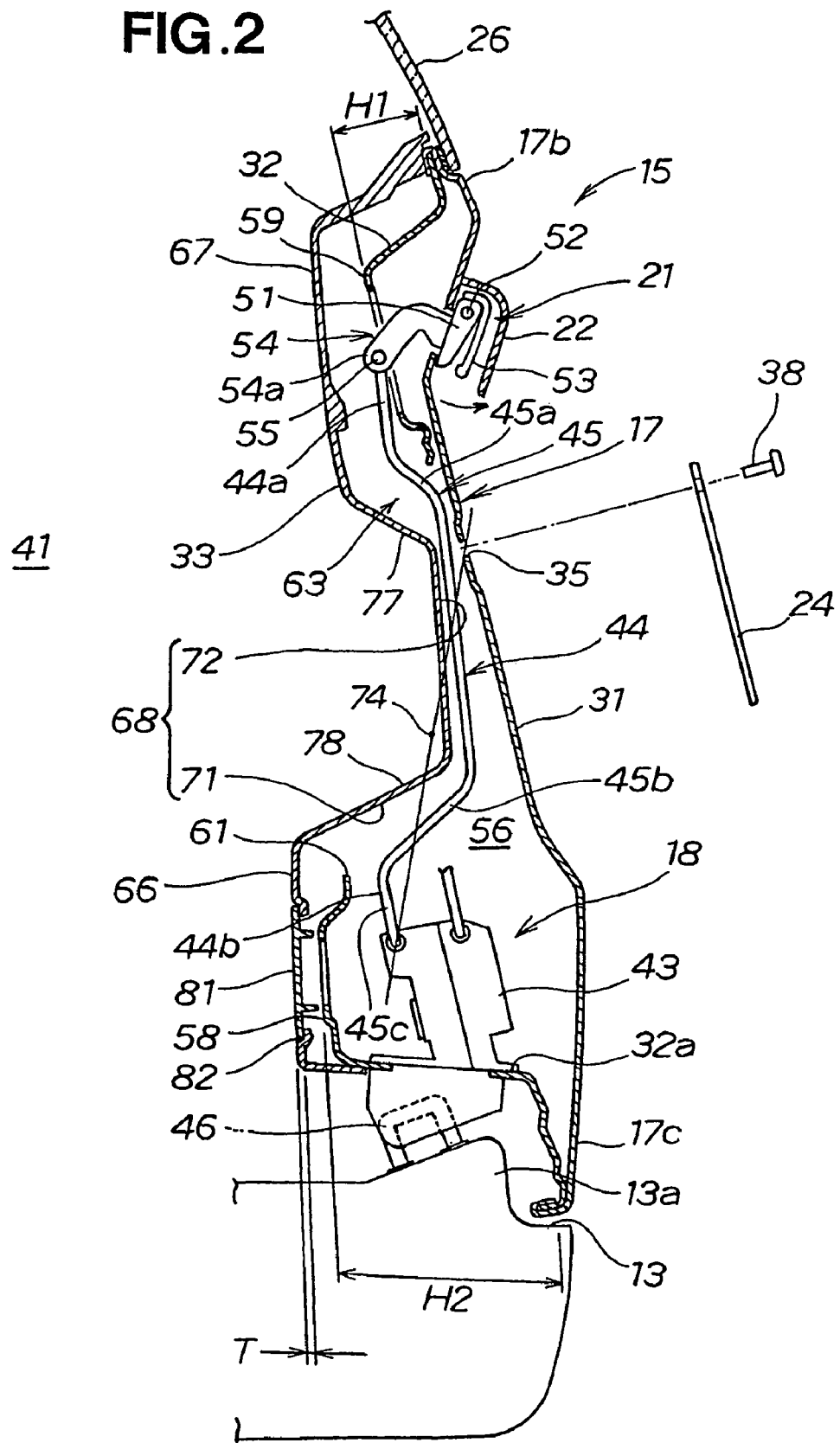
FIG. 2 is a sectional view taken along line 2-2 of FIG. 1.

As shown in FIG. 2, the tailgate 17 has the outer panel 31 in which the plate mounting holes 35 and lamp mounting holes 36 (FIG. 1) are formed, an inner panel (frame) 32 that is provided to the vehicle compartment 41 side of the outer panel 31, and a lining 33 for covering the inner panel 32 from inside the vehicle compartment 41.

The lock device 18 has a lock mechanism 43 provided to a lower end 17c of the tailgate 17, a handle rod (transmitting member) 44 that connects a latch (not shown) of the lock mechanism 43 to the handle 21, and the handle 21 for operating the handle rod 44.

The lock mechanism 43 is provided to the center 32a (center in the width direction of the vehicle) of the lower end part of the frame 32, and is a mechanism in which the latch can interlock with a striker 46.

The striker 46 is provided to a lower end part 13a of the tailgate opening 13.

The handle 21 has a base 51 provided to the outer panel 31, a handle unit 53 that is swingably supported on the base 51 via a pin 52, and a handle lever (lock operating part) 54 provided to the handle unit 53. The operation of the handle lever 54 is transmitted to the handle rod 44.

An upper end part 44a of the handle rod 44 is connected to a distal end part 54a of the handle lever 54 via a pin 55.

The handle unit 53 swings around the pin 52 as shown by the arrow, whereby the handle rod 44 is pushed down. The latch of the lock mechanism 43 is actuated, and disengaged from the striker 46.

The tailgate 17 can thereby be opened around the hinge 27 in the direction shown by the arrow (see FIG. 1).

Conversely, causing the latch of the lock mechanism 43 to interlock with the striker 46 makes it possible to keep the tailgate 17 in a closed state.

Figure 3:
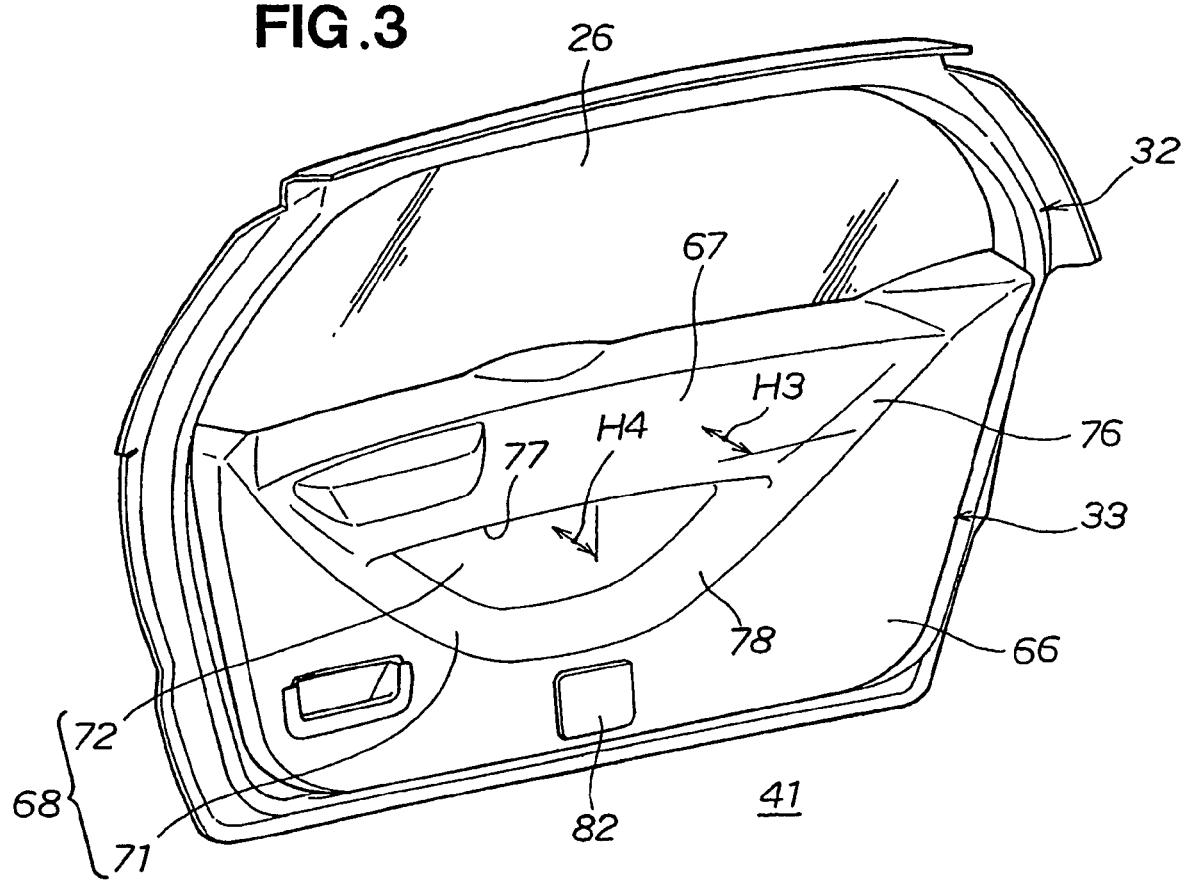
FIG. 3 is a perspective view showing the tailgate of FIG. 1 as viewed from inside the vehicle compartment.
Figure 4:
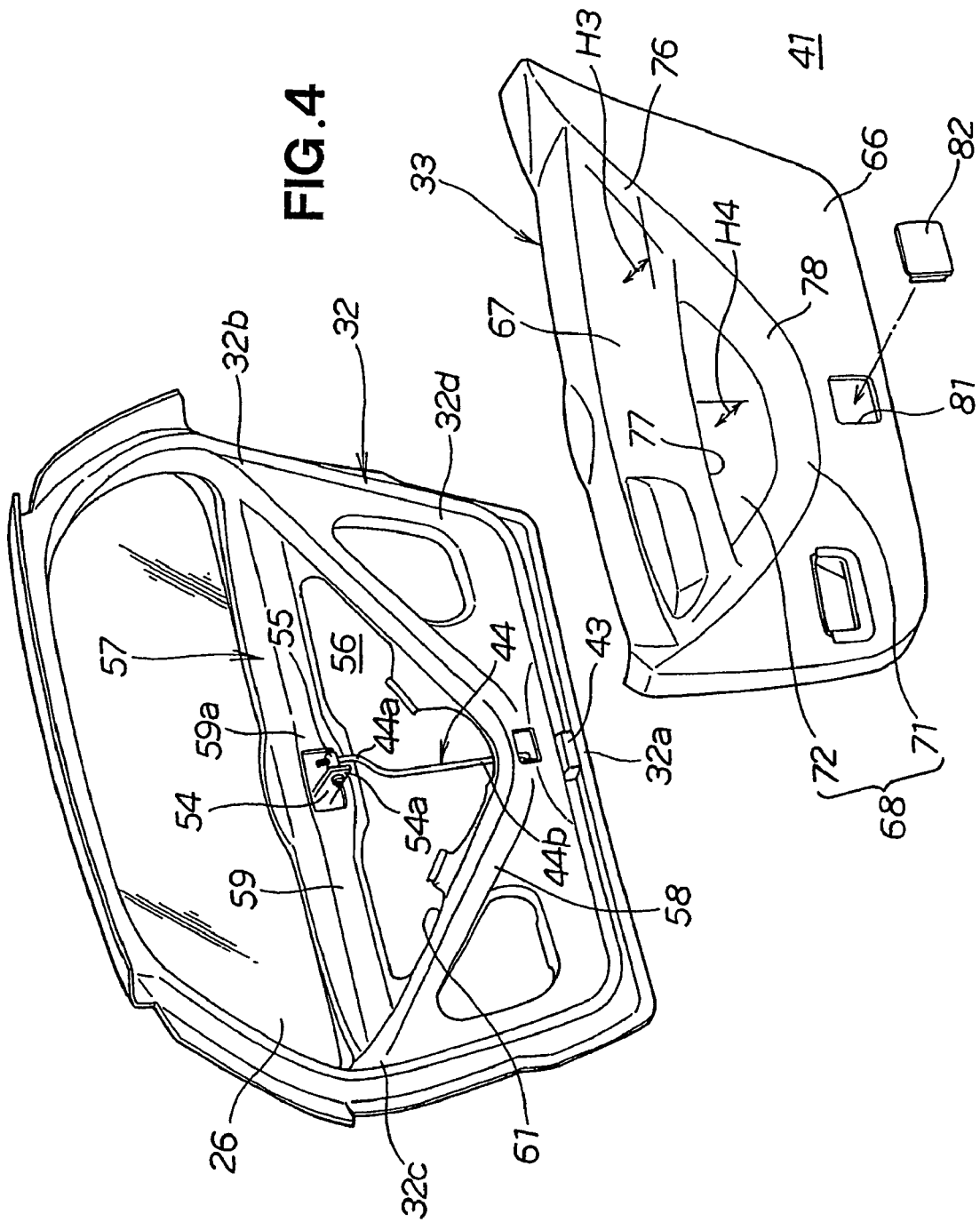
FIG. 4 is an exploded perspective view of the tailgate of FIG. 3.

As shown in FIG. 3 and FIG. 4, the inner panel or frame 32 is provided to the vehicle compartment 41 side of the outer panel 31 (FIG. 1), and the lock mechanism 43 (see FIG. 2) is provided to the center 32a of the lower end part; i.e., the center of the lower end part in the width direction of the vehicle.

The lock mechanism 43 is provided to the center 32a of the lower end part of the frame 32, and to a rear space 56 (see FIG. 2) between the inner panel 32 and the outer panel 31.

The inner panel 32 has a framework 58 formed in a substantial V-shape that extends steeply upward from the center 32a of the lower end part where the lock mechanism 43 is provided to lateral parts 32b, 32c in the width direction of the vehicle. An upper framework 59 connects the end parts 32b, 32c (i.e., lateral parts of the inner panel 32 in the width direction of the vehicle) of the framework 58. A frame opening (opening) 61 is formed in a lower half 32d of the inner panel 32 along the substantially V-shaped framework 58 and the upper framework 59.

A substantially triangular framework structure 57 is formed by the substantially V-shaped framework 58 and the upper framework 59.

The upper framework 59 is formed closer to the outer panel than the substantially V-shaped framework 58 heading outward from the vehicle in a direction that extends into and out of the vehicle.

Specifically, the height H1, a dimension extending between the outer panel and the inner panel, (see FIG. 2) of the upper framework 59 is less than the height H2 (see FIG. 2) of the substantially V-shaped framework 58.

An upper center opening 59a is formed substantially in the center of the upper framework 59. A distal end part 54a of the handle lever 54 protrudes toward the lining 33 from the upper center opening 59a.

An upper end part 44a of the handle rod 44 connected to the distal end part 54a of the handle lever 54 is positioned in a front space 63 (FIG. 2) between the inner panel 32 and the lining 33.

A lower end 44b of the handle rod 44 passes through the frame opening 61, is disposed in a rear space 56 between the inner panel 32 and the outer panel 31, and is connected to the latch (not shown) of the lock mechanism 43.

The frame opening 61 is formed along the V-shaped framework 58 and the upper framework 59. Consequently, a lower inclined edge of the frame opening 61 is reinforced by the V-shaped framework 58, and an upper horizontal edge of the frame opening 61 is reinforced by the upper framework 59.

In other words, the frame opening 61 is formed in a substantially triangular shape inside the substantially triangular framework structure 57. Accordingly, the periphery of the frame opening 61 is reinforced by the substantially triangular-shaped framework structure 57.

As shown in FIG. 2, the frame opening 61 is formed between the plate mounting holes 35 and the lock mechanism 43, and between the lamp mounting holes 36 (see FIG. 1) and the lock mechanism 43.

As shown in FIG. 4, the frame opening 61 is provided to the lower half 32d of the inner panel 32 in the same manner as the V-shaped framework 58 and the upper framework 59.

The lining 33 is mounted on the lower half 32d of the inner panel 32.

The lining 33 has a first wall part 66 for covering the substantially V-shaped framework 58, a second wall part 67 for covering the upper framework 59, and a protrusion 68 for covering and extending through the frame opening 61.

The protrusion 68 is a region formed by a substantially triangular-shaped periphery wall part 71 that is surrounded by the first wall part 66 and the second wall part 67, and a bottom part 72 for closing off a bottom edge of the periphery wall part 71.

The periphery wall part 71 is a wall part that protrudes toward the exterior of the vehicle body from the first wall part 66 and the second wall part 67. Closing off the bottom edge of the periphery wall part 71 using the bottom part 72 makes it possible to form the protrusion 68 as a region that protrudes toward the exterior vehicle body from the first wall part 66 and the second wall part 67.

The first wall part 66 is provided at a position that is further away from the outer panel than the second wall part 67 by a distance equal to the height H3.

The bottom part 72 is formed closer to the outer panel than the second wall part 67 heading outward from the vehicle in the direction that extends into and out of the vehicle in the tailgate 17. Specifically, the second wall part 67 is provided at a position that is further away from the outer panel than the bottom part 72 of the protrusion 68 by a distance equal to the height H4.

A lining opening 81 is formed in the center of the bottom part of the first wall part 66. The lining opening 81 is covered by a cover 82.

The protrusion 68 will be described in detail with reference to FIG. 2.

The protrusion 68 is a region that protrudes toward the outer panel 31 through the frame opening 61, and protrudes along a straight line 74 that connects the plate mounting holes 35 and the lock mechanism 43.

The protrusion 68 protrudes along the straight line (not shown) that connects the lamp mounting holes 36 (see FIG. 1) and the lock mechanism 43.

A rod-shaped member (not shown), when inserted into the tailgate 17 from the plate mounting holes 35 or the lamp mounting holes 36 and pushed toward the lock mechanism 43, will accordingly come into contact with the protrusion 68. The protrusion 68 can thereby be used to prevent the rod-shaped member from reaching the lock mechanism 43.

As shown in FIG. 4, the frame opening 61 is formed inside the substantially triangular framework structure 57, whereby the periphery of the frame opening 61 is reinforced by the substantially triangular framework structure 57.

Accordingly, even if the frame opening 61 is formed in the inner panel 32, the rigidity of the inner panel 32 can be ensured by the framework 58 and the upper framework 59, and the frame opening 61 can be made relatively larger.

The protrusion 68 can thereby be made larger, in accordance with the frame opening 61. Making the protrusion 68 larger allows a rod-shaped member that has been inserted toward the lock mechanism 43 to come in contact with the protrusion 68, and to be prevented from reaching the lock mechanism 43 in a more reliable manner.

A simple configuration merely involving the frame opening 61 being formed in the inner panel 32 and the protrusion 68 being provided to the lining 33 makes it possible to prevent the rod-shaped member from penetrating. Therefore, the shape of the inner panel 32 and the lining 33 (i.e., the tailgate 17) can be made less complex.

The inner panel 32 can be formed using steel because the inner panel 32 is fashioned in a simple shape.

Forming the inner panel 32 using steel makes it possible to readily ensure the rigidity of the tailgate 17.

Having the protrusion 68 of the lining 33 protrude toward the outer panel 31 causes the lining 33 to protrude toward the exterior of the vehicle body. It is thereby possible to increase the space inside the vehicle compartment 41.

Forming the frame opening 61 inside the substantially triangular framework structure 57, as shown in FIG. 4, allows the periphery of the frame opening 61 to be reinforced by the substantially triangular framework structure 57.

Consequently, the rigidity of the inner panel 32 can be ensured by the framework 58 and the upper framework 59, and the frame opening 61 can be made relatively larger, even when the frame opening 61 is formed in the inner panel 32.

The reason for making the frame opening 61 relatively larger will be described below.

As described above, the first wall part 66 is provided at a position that extends further away from the outer panel than the second wall part 67 by a distance equal to the height H3 (see FIG. 4), and the second wall part 67 is provided at a position that extends further away from the outer panel than the bottom part 72 of the protrusion 68 by a distance equal to the length H4 (see FIG. 4).

First through third stepped parts (a plurality of stepped parts) 76 through 78 are thus formed as a result of the lining 33 having the first wall part 66, the second wall part 67, and the bottom part 72 of the protrusion 68.

Specifically, the first stepped part 76, which extends toward the vehicle exterior, is formed by the first wall part 66, the periphery wall part 71, and the second wall part 67.

The second stepped part 77, which heads toward the outside of the vehicle, is formed by the second wall part 67, the periphery wall part 71, and the bottom part 72.

The third stepped part 78, which extends toward the vehicle exterior, is formed by the first wall part 66, the periphery wall part 71, and the bottom part 72.

Specifically, the first through third stepped parts 76 through 78 are formed by the first wall part 66 for covering the substantially V-shaped framework 58, the second wall part 67 for covering the upper framework 59, and the bottom part 72 of the protrusion 68.

The protrusion 68 has the second stepped part 77 and the third stepped part 78. The second stepped part 77 is formed along the upper framework 59, and the third stepped part 78 is formed along the substantially V-shaped framework 58.

Having the framework 58 and the upper framework 59 ensure the rigidity of the frame 32 enables the frame opening 61 to be made relatively larger, as described above.

As a result, the protrusion 68 can be made even larger, and the space inside the vehicle compartment 41 can be further increased.

The first through third stepped parts 76 through 78 are oriented toward a center direction of the tailgate 17 from the exterior with respect to the width direction of the vehicle, and are formed in a plurality of locations.

Providing the first through third stepped parts 76 through 78 in a plurality of locations in the lining 33 makes it possible to further increase the rigidity of the lining 33.

Increasing the rigidity of the lining 33 makes it possible to reduce the thickness T of the lining 33, so as to reduce the weight of the vehicle body.

As shown in FIG. 2, the handle rod 44 has a curved part 45 that curves toward the outside of the vehicle at a location that corresponds to the protrusion 68 formed in the lining 33. When the curved part 45 is formed in the handle rod 44 so as to correspond to the protrusion 68 of the lining 33, the handle rod 44 can thus be disposed in the space between the outer panel 31 and the lining 33. Even if the protrusion 68 is positioned between the handle lever 54 and the lock mechanism 43, the handle rod 44 can be connected between the handle lever 54 and the lock mechanism 43 at the shortest possible distance, extra space in the tailgate 17 for disposing components is rendered unnecessary, and the shape can be prevented from being made complex.

The curved part 45 has a first curved part 45a that curves toward the outside of the vehicle, a second curved part 45b that curves toward the lock mechanism 43 from an end part of the first curved part 45a, and a third curved part 45c that curves toward the vehicle compartment from an end part of the second curved part 45b.

The first curved part 45a curves at a position that is set apart from the second wall part 67 of the lining 33. Therefore, the handle rod 44 is prevented from interfering with the protrusion 68 of the lining 33, even when operated (moved) using the handle lever 54.

An end part of the third curved part 45c is connected to the lock mechanism 43. Therefore, the end part of the handle rod 44 on the lock mechanism 43 side is set apart from the outer panel 31 by the third curved part 45a, the handle rod 44 is not readily operated from outside the vehicle, and the tailgate 17 is prevented from being improperly unlocked.

The third curved part 45c curves at a position that is set apart from the first wall part 66 of the lining 33. Therefore, the handle rod 44 is prevented from interfering with protrusion 68 of the lining 33, even when the handle rod 44 is operated (moved) using the handle lever 54.

Figure 5:
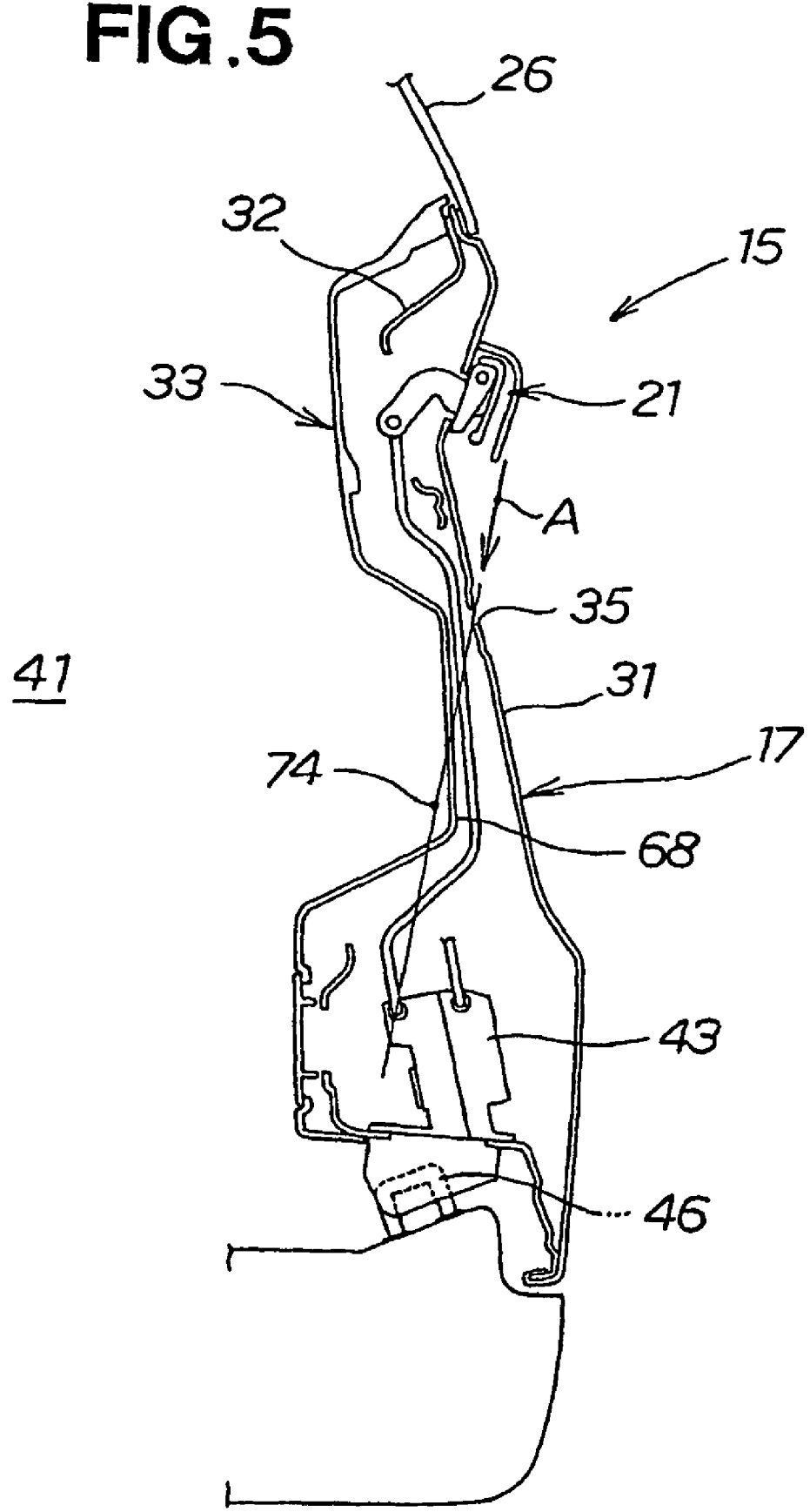
FIG. 5 is a schematic view showing an example in which the lock is prevented from being improperly released in the tailgate structure of FIG. 2.

An example in which improper unlocking is prevented will be described below with reference to FIG. 5.

The rod-shaped member (not shown) comes into contact with the protrusion 68 on being inserted into the tailgate 17 from the plate mounting holes 35 as shown by the arrow A.

The protrusion 68 thereby prevents the rod-shaped member from reaching the lock mechanism 43.

Therefore, it is possible to reliably prevent the lock mechanism 43 (i.e., the lock of the tailgate 17) from being improperly unlocked by the rod-shaped member.

As is also the case when the rod-shaped member (not shown) is inserted into the tailgate 17 from the lamp mounting holes 36 (FIG. 1), the rod-shaped member will come into contact with the protrusion 68 in the same manner as when the rod-shaped member is inserted from the plate mounting holes 35.

Therefore, it is possible to reliably prevent the lock mechanism 43 (i.e., lock of the tailgate 17) from being wrongfully unlocked.

Causing the protrusion 68 of the lining 33 to protrude toward the outer panel 31 makes it possible to cause the lining 33 to protrude toward the outside of the vehicle.

As a result, the space inside the vehicle compartment 41 can be increased, and it is possible to improve utility inside the vehicle compartment 41.

In the present embodiment, an example was given in which first through third stepped parts 76 through 78 are the plurality of stepped parts. However, this quantity of stepped parts is not provided by way of limitation; it is possible to appropriately select another quantity such as two.

In the present embodiment, the plate mounting holes 35 and the lamp mounting holes 36 are given as examples of mounting holes for externally mounted components. However, these applications are not provided by way of limitation; the holes may be used for mounting other externally mounted components.

Industrial Applicability

The tailgate structure of the present invention has a lock mechanism provided to a tailgate, and is suitable for use in an automotive vehicle in which a mounting hole for an externally mounted component is formed in an outer panel of a tailgate.

The invention claimed is:
1. A tailgate structure comprising:
a tailgate comprised of an outer panel with a mounting hole formed for an externally mounted component, an inner panel formed as a frame provided on that side of the outer panel which faces a vehicle compartment, and a lining for covering the frame from inside the vehicle compartment, the tailgate being adapted to be openably/closably disposed on a vehicle body; and a lock mechanism provided on the frame so as to allow interlocking engagement of the tailgate with the vehicle body, wherein the frame has an opening formed between the mounting hole and the lock mechanism, and the lining has a protrusion protruding through the opening toward the outer panel along a straight line passing over the mounting hole and the lock mechanism, wherein the protrusion protrudes through the opening toward the outer panel along a straight line connecting the mounting hole and the lock mechanism, and wherein a transmitting member extending from the lock mechanism is disposed adjacent to an outermost face of the protrusion extending through the opening.

2. The tailgate structure of claim 1, wherein the protrusion has a stepped part extending in a direction toward an exterior of the vehicle.

3. The tailgate structure of claim 2, wherein the stepped part is provided in a plurality of locations of the tailgate near a center of a width direction of the vehicle.

4. The tailgate structure of claim 1, wherein the lock mechanism is provided on a vehicle-width-direction center of the frame, the frame includes a framework of V-shape extending steeply upwardly to sides of the vehicle from a region where the lock mechanism is provided, and the opening is formed in the frame along the V-shaped framework.

5. The tailgate structure of claim 4, wherein the lining includes:
    a first wall part for covering the V-shaped framework formed in the frame;
    a second wall part for covering an upper framework that connects both ends of the V-shaped framework and is formed in a position that is closer to the outer panel than the V-shaped framework in the exterior direction of the vehicle; and
    a protrusion bottom part which is formed lower than the second wall part in the exterior direction of the vehicle.

6. The tailgate structure of claim 4, wherein the protrusion substantially fills the opening.

7. The tailgate structure of claim 1, wherein the transmitting member is disposed adjacent the protrusion in a space formed between the outer panel and the lining, for transmitting an action of a lock operation part to lock and unlock the lock mechanism, wherein the transmitting member has a curved part that curves toward the exterior of the vehicle in a region corresponding to the protrusion.

8. The tailgate structure of claim 7, wherein the curved part includes a first curved part that curves toward the exterior of the vehicle, and a second curved part that curves toward the lock mechanism from an end part of the first curved part, and the first curved part curves at a position that is set apart from wall parts of the protrusion.

9. The tailgate structure of claim 7, wherein the transmitting member extends from above the opening to below the opening.

10. The tailgate structure of claim 8, wherein the curved part further includes a third curved part that curves toward the vehicle compartment from an end part of the second curved part, and an end part of the third curved part is connected to the lock mechanism.

11. The structure of claim 10, wherein the third curved part curves at a position that is set apart from wall parts of the protrusion.

12. The tailgate structure of claim 1, wherein the frame is triangularly shaped and the opening is formed in a central portion of the frame.

13. The tailgate structure of claim 12, wherein the lining protrusion is triangularly shaped similarly to the opening and covers the opening.

14. The tailgate structure of claim 1, wherein the frame is formed of metal.

15. The tailgate structure of claim 1, wherein the protrusion protrudes between the mounting hole and the lock mechanism such that the protrusion blocks passage of a rod-shaped tool from the mounting hole to the lock mechanism.

16. The tailgate structure of claim 1, wherein the protrusion substantially fills the opening.

* * * * *